No. 758,432. PATENTED APR. 26, 1904.
T. A. EDISON.
STOCKHOUSE CONVEYER.
APPLICATION FILED JAN. 9, 1903.
NO MODEL. 4 SHEETS—SHEET 2.
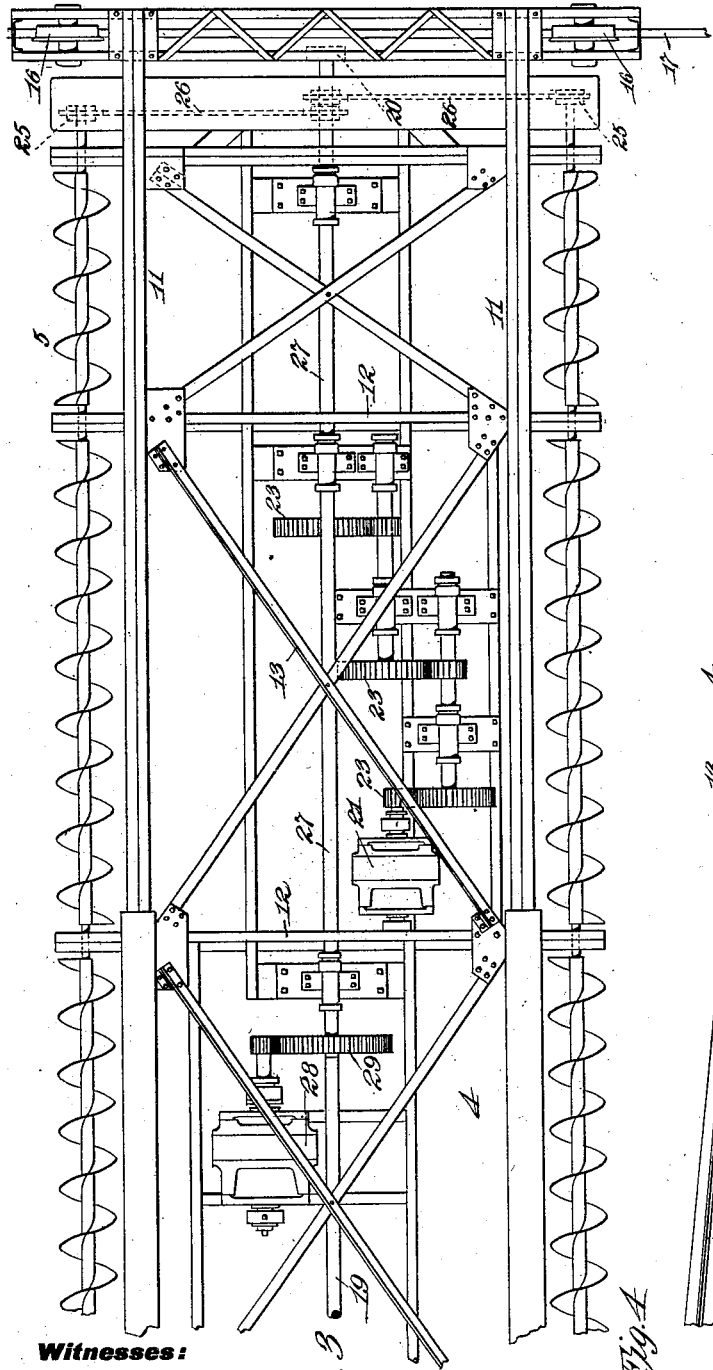
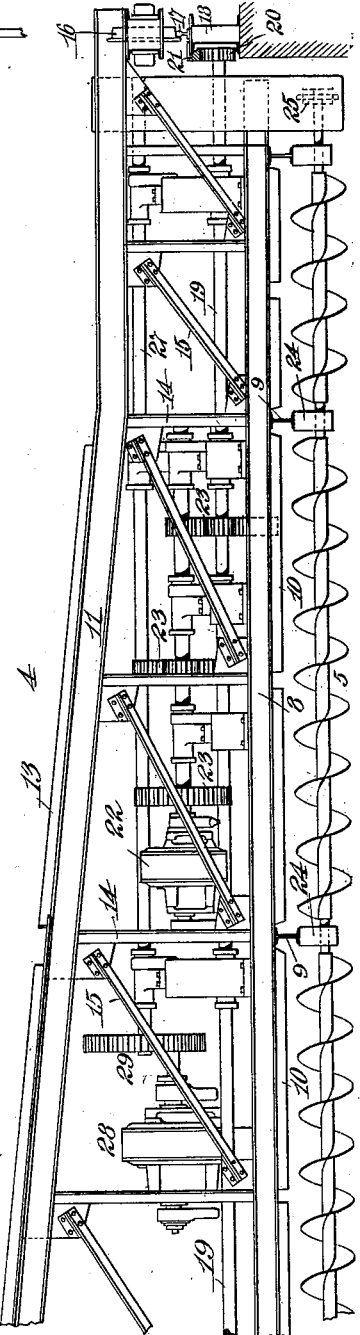
Witnesses: Inventor
Jas. F. Coleman Thomas A. Edison
Jno. Robt Taylor by Dyer Edmonds & Dyer
Attorneys No. 758,432. PATENTED APR. 26, 1904.
T. A. EDISON.
STOCKHOUSE CONVEYER.
APPLICATION FILED JAN. 9, 1903.
NO MODEL. 4 SHEETS—SHEET 3.
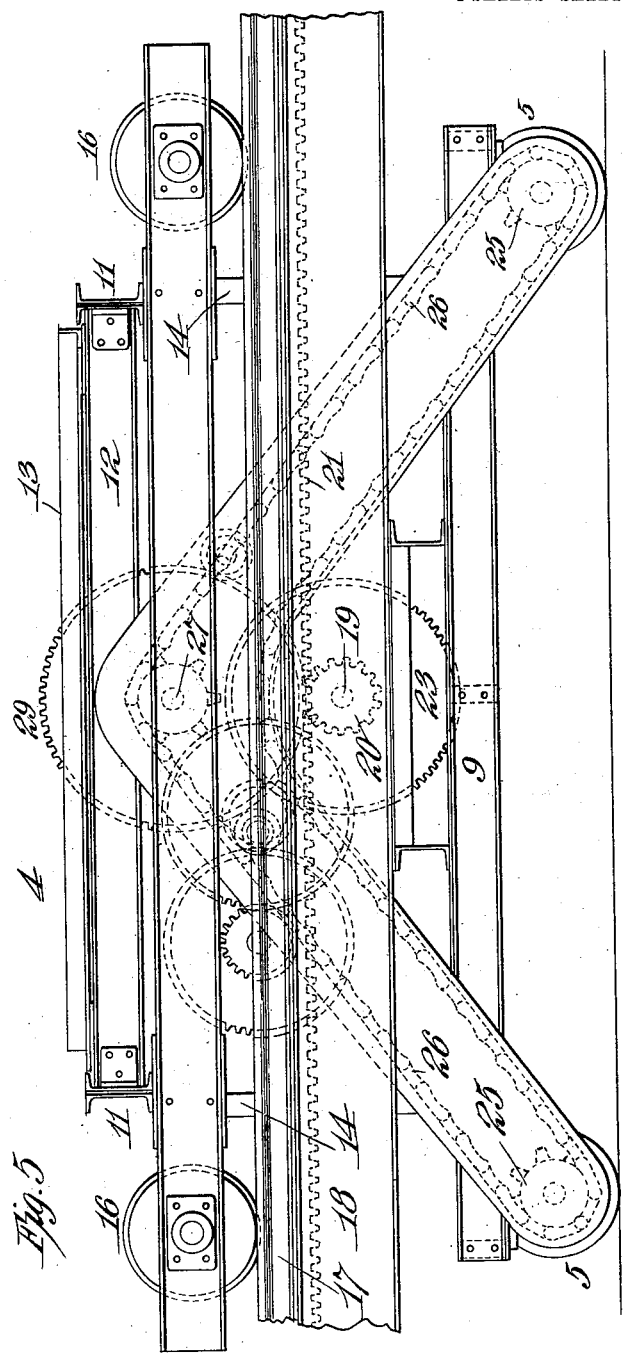
Witnesses: Inventor.
Jas. F. Coleman
Jno. Robt Taylor
Thomas A Edison
by Dyer Edmond
Attorneys No. 758,432. PATENTED APR. 26, 1904.
T. A. EDISON.
STOCKHOUSE CONVEYER.
APPLICATION FILED JAN. 9, 1903.
NO MODEL. 4 SHEETS—SHEET 4.
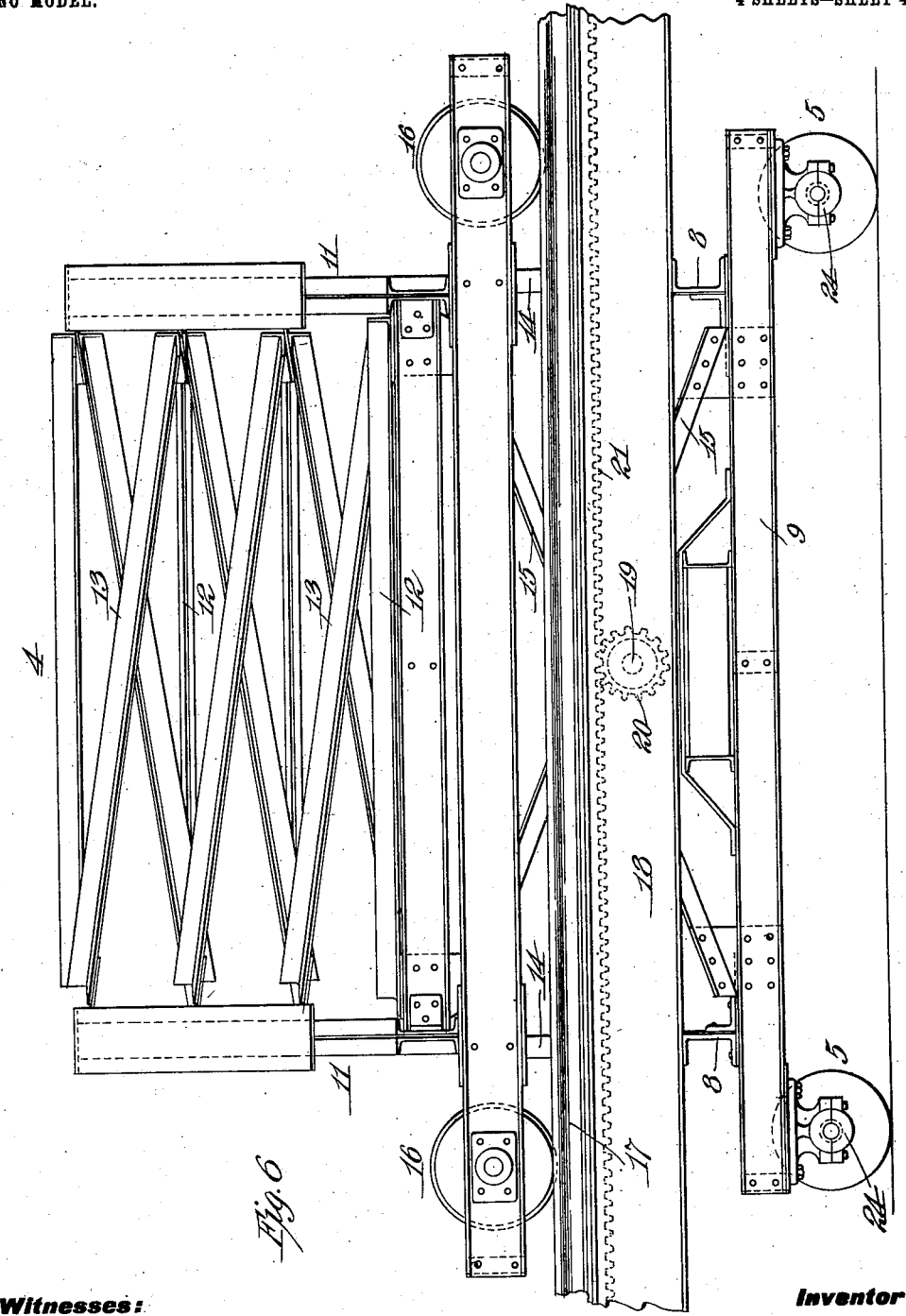
Witnesses:
Jas. F. Coleman
Jno. Robt Taylor
Inventor
Thomas A Edison
by Dyer Edmunds & Dyer
Attorneys No. 758,432. Patented April 26, 1904.

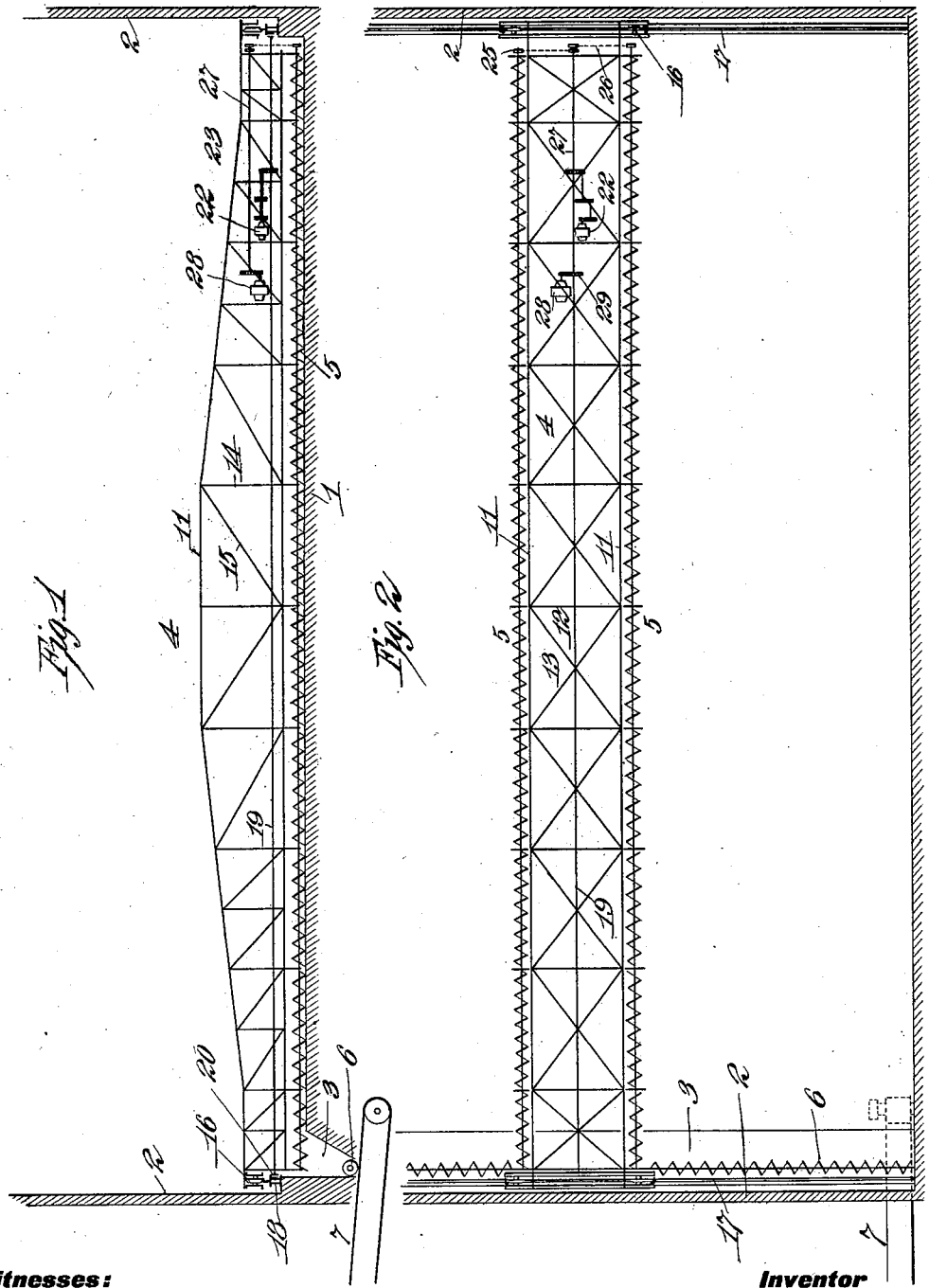

UNITED STATES PATENT OFFICE.

THOMAS A. EDISON, OF LLEWELLYN PARK, NEW JERSEY.

STOCK-HOUSE CONVEYER.

SPECIFICATION forming part of Letters Patent No. 758,432, dated April 26, 1904.

Application filed January 9, 1903. Serial No. 138,429. (No model.)

*To all whom it may concern:*

Be it known that I, THOMAS A. EDISON, a citizen of the United States, residing at Llewellyn Park, Orange, in the county of Essex and State of New Jersey, have invented a certain new and useful Improvement in Stock-House Conveyers, of which the following is a description.

My invention relates to an improved apparatus by means of which material in bulk, like cement or cement mixtures, can be effectively removed from stock-houses having substantially level floors, thereby overcoming the expense of building stock-houses with hopper-like bottoms and with tunnels beneath the same for containing the conveying devices. By the use of the present invention I am enabled to build stock-houses with solid flat floors composed, preferably, of concrete, requiring only a light and relatively inexpensive protecting-shed for covering the material, thus reducing the expense to a minimum, while at the same time the material can be removed from the stock-house practically with the same facility as when the stock-house is formed of a series of hoppers with a tunnel beneath them containing the conveying devices, as at present.

My object, therefore, is to provide a simple and effective conveyer by means of which material can be removed in bulk from any part of a stock-house having a substantially flat bottom, all as I will more fully hereinafter describe and claim.

Broadly speaking, the invention consists of one or more conveyers arranged to work as close as practicable to the bottom of the stock-house, so as to remove material to one or both of the sides thereof, combined with one or more auxiliary conveyers receiving the material so removed and conveying it to the desired exterior point, the main conveyer or conveyers being bodily removable, so as to engage with the material at any point of the stock-house. Preferably the main conveyer or conveyers are mounted so as to travel lengthwise of the stock-house, somewhat after the manner of a traveling crane, so as to engage with material deposited in large piles at any place within the establishment.

In carrying the invention into effect I employ details of construction, some of which embody features of novelty which will be made the subject of subordinate claims.

In order that the invention may be better understood, attention is directed to the accompanying drawings, forming part of this specification, and in which—

Figure 1 is a diagrammatic side view, partly in section, showing the invention in its preferred form, with a single auxiliary conveyer arranged in a pit near one side of the stock-house; Fig. 2, a corresponding plan view; Fig. 3, an enlarged plan view of the main conveyers and bridge for carrying the same, showing the motors for operating the conveyers and bridge, respectively; Fig. 4, an elevation of the same parts; Fig. 5, an end view of the bridge and conveyers, viewing the same from the drive end; and Fig. 6, a corresponding view of the delivery end.

In all of the above views corresponding parts are represented by the same numerals of reference.

Referring first to Figs. 1 and 2, the stock-house is provided with a bottom 1, made, preferably, of concrete, and which is substantially flat, with sides 2 2 made of some light cheap material, such as corrugated iron, with a top or roof (not shown) and with a pit 3 formed at the bottom at one or both of the sides. Movable longitudinally of the stock-house is a bridge 4, the preferred details of which will be presently described, carrying one or more conveyers 5 5, two being shown. Ordinary screw conveyers are illustrated. These conveyers work as close as practicable to the bottom 1 and deliver material deposited on the floor 1 to the pit 3. Mounted in this pit is a conveyer 6, illustrated as an ordinary worm or screw and delivering material to a conveyer 7, shown as a conveying-belt.

From the two views to which attention has been particularly directed the general scheme will be understood, material being deposited on the floor 1 in any suitable way to accumulate in a series of large conical piles or a single mass, and being transported laterally so as to be deposited in the pit 3, from which it is removed by the conveyer 6 to the conveyer 7.

The preferred details of construction are illustrated in the remaining views, to which attention is now directed.

The bridge 4 comprises two lower chords 8 8, connected together by cross-beams 9 and diagonal braces 10, and two upper chords 11 11, connected together by cross-beams 12 and diagonal braces 13. The upper and lower chords at each side are connected together by vertical beams 14 and diagonal braces 15, so that the whole bridge constitutes a very light but rigid structure. The bridge as a whole is mounted on wheels 16, carried on tracks 17, so as to be movable longitudinally of the stock-house. The tracks 17 are mounted on beams 18, arranged at the side of the stock-house, as shown. Extending entirely across the bridge is a drive-shaft 19, carrying a pinion 20 at each end, said pinions engaging racks 21, secured to the track-supporting beams 18. The shaft 19 is driven by a motor 22, preferably an electric motor, through suitable gearing 23. By operating the motor 22 in either direction it will be obvious that the bridge as a whole may be caused to travel in either direction longitudinally of the stock-house at a slow speed. The conveyers 5 are mounted in bearings 24, carried by the lower cross-beams 9, and each is provided at one end with a sprocket-wheel 25, driven by a sprocket-chain 26 from an operating-shaft 27, located vertically above the drive-shaft 19. This operating-shaft 27 is driven by a motor 28, preferably an electric motor, through gearing 29. By operating the motor 28 it will be obvious that the two conveyers 5 will be simultaneously rotated to direct material toward the pit 3. It will be of course understood that where a pit is used at each side of the stock-house the main conveyer or conveyers will be oppositely pitched from the center to either side, so that material will be conducted equally to both of the pits.

In operation the material is accumulated in the stock-house in a single large conical pile or in a series of piles, and the motor 28 is operated to drive the main conveyer or conveyers. These conveyers engage the material and transport it toward the pit 3, from which it is removed by the conveyer 6. When necessary, the motor 22 is operated to shift the bridge slightly sidewise, so that the conveyers 5 will be always kept supplied with material.

Having now described my invention, what I claim as new, and desire to secure by Letters Patent, is as follows:

1. Apparatus for removing material in bulk from stock-houses, having substantially flat bottoms, comprising in combination a pair of bodily-movable main conveyers feeding in the same direction and extending parallel with and closely adjacent to the bottom, so as to directly move the material thereon, and an auxiliary conveyer for receiving material from the main conveyers, substantially as and for the purposes set forth.

2. Apparatus for removing material in bulk from stock-houses having substantially flat bottoms, comprising in combination a pair of main conveyers feeding in the same direction and extending parallel with and closely adjacent to the bottom, so as to directly move the material thereon, means for moving the main conveyer longitudinally of the stock-house, and an auxiliary conveyer extending longitudinally of the stock-house for receiving material from the main conveyers, substantially as and for the purposes set forth.

3. Apparatus for removing material in bulk from stock-houses having substantially flat bottoms, comprising in combination a bodily-movable bridge braced against vertical strains, a main conveyer carried by the bridge and engaging material on said bottoms, and an auxiliary conveyer receiving material removed by the main conveyer, substantially as and for the purposes set forth.

4. Apparatus for removing material in bulk from stock-houses having substantially flat bottoms, comprising in combination a bridge, braced against vertical strains, means for moving the bridge longitudinally of the stock-house, a main conveyer carried by the bridge and engaging material on said bottoms, and an auxiliary conveyer extending longitudinally of the stock-house for receiving material removed by the main conveyer, substantially as and for the purposes set forth.

5. Apparatus for removing material in bulk from stock-houses having substantially flat bottoms, comprising in combination a bridge, means for moving the bridge longitudinally of the stock-house, a pair of main conveyers carried by the bridge, feeding in the same direction and extending parallel with and closely adjacent to the bottom to directly move the material thereon, and an auxiliary conveyer extending longitudinally of the stock-house, for receiving material removed by the main conveyers, substantially as and for the purposes set forth.

6. Apparatus for removing material in bulk from stock-houses having substantially flat bottoms, comprising in combination a bridge braced against vertical strains, a motor for bodily adjusting the same, a main conveyer carried by the bridge and engaging material on said bottoms, a separate motor carried by the bridge for operating the main conveyer, and an auxiliary conveyer receiving material removed by the main conveyer, substantially as and for the purposes set forth.

7. Apparatus for removing material in bulk from stock-houses having substantially flat bottoms, comprising in combination a bridge, an electric motor carried by the bridge for bodily adjusting the same longitudinally of the stock-house, a main conveyer carried by the bridge, and engaging material on said bottoms, an independent motor carried by the bridge for operating the main conveyer, and an auxiliary conveyer extending longitudinally of the stock-house for receiving material removed by the main conveyer, substantially as and for the purposes set forth.

8. Apparatus for removing material in bulk from stock-houses having substantially flat bottoms, comprising in combination a bridge braced against vertical strains, a main conveyer carried by the bridge, means for adjusting the bridge longitudinally of the stock-house, and an auxiliary conveyer mounted in a pit extending longitudinally at the side of the stock-house and receiving material removed by the main conveyer, substantially as and for the purposes set forth.

9. Apparatus for removing material in bulk from stock-houses having substantially flat bottoms, comprising in combination a bridge, a main conveyer carried by the bridge, two independent motors carried by the bridge for adjusting the same longitudinally of the stock-house and for operating the main conveyer respectively, and an auxiliary conveyer mounted in a pit at the side of the stock-house for receiving material removed by the main conveyer, substantially as and for the purposes set forth.

10. Apparatus for removing material in bulk from stock-houses having substantially flat bottoms, comprising in combination a bridge, a pair of main conveyers carried by the bridge, independent motors carried by the bridge for adjusting the bridge longitudinally of the stock-house and for operating the main conveyers respectively, and an auxiliary conveyer mounted in a pit at the side of the stockhouse for receiving material removed by the main conveyers, substantially as and for the purposes set forth.

This specification signed and witnessed this 18th day of December, 1902.

THOMAS A. EDISON.

Witnesses:
FRANK L. DYER,
JNO. ROBT. TAYLOR.